United States Patent [19]
Pierret et al.

[11] 3,941,235
[45] Mar. 2, 1976

[54] CONVEYOR WITH MEANS FOR PREVENTING ACCUMULATION OF MATERIAL

[76] Inventors: Hubert Pierret, 29, rue du Tambour; Luc Pierret, 13, rue du Sommet; Gabriel Pierret, 33, rue du Tambour; Maurice Pierret, 15, rue de l'Eglise; Jean-Marie Pierret, Rue du Sommet, all of B - 6838 Corbion-sur-Semois, Belgium

[22] Filed: Nov. 20, 1973

[21] Appl. No.: 417,495

[30] Foreign Application Priority Data
Nov. 22, 1972 Belgium .............................. 791755

[52] U.S. Cl. ................................. 198/27; 198/106
[51] Int. Cl.² ......................................... B65G 47/02
[58] Field of Search ............. 198/27, 229, 230, 160, 198/166, 224, 24, 106; 226/5, 113, 168; 19/129 R, 144.5, 156.1

[56] References Cited
UNITED STATES PATENTS

| | | |
|---|---|---|
| 584,027 | 6/1897 | Wilkinson ............................ 198/21 |
| 1,793,246 | 2/1931 | Philips ................................. 198/230 |
| 2,499,175 | 2/1950 | Wilkie.................................. 198/230 |
| 2,580,940 | 1/1952 | Molins et al. .................... 198/160 X |
| 2,671,553 | 3/1954 | Herndon .............................. 198/166 |
| 3,229,807 | 1/1966 | Moore ................................. 198/229 |
| 3,288,275 | 11/1966 | Bunting............................... 198/230 |
| 3,592,374 | 7/1971 | Adler................................... 226/113 |
| 3,626,552 | 12/1971 | Walker et al. ..................... 19/129 R |

FOREIGN PATENTS OR APPLICATIONS
1,075,502  7/1967  United Kingdom................. 198/230

*Primary Examiner*—James B. Marbert
*Assistant Examiner*—Richard K. Thomson
*Attorney, Agent, or Firm*—Cushman, Darby & Cushman

[57] ABSTRACT

Conveyor, particularly a conveyor for materials in the shape of fibres lying in a sheet, said conveyor comprising at least two consecutive conveying elements at least one of which is movable and between which there remains a space; at least one movable member extending in said space cross-wise to the lengthwise axis of the conveyor; and moving means for imparting to said movable member a motion on either side of the median plane of said space between four end positions as follows: a first end position in which the member takes over the material falling in said space, a second end position in which said member lays the material having entered said space in such a position that said material will be taken over by the second conveyor element to pursue the conveying thereof on said conveyor, and two intermediate positions in which said member is situated in the proximity of the conveyor movable element and the second conveyor element; said means for moving said movable member being arranged so as said member and said conveyor movable element are driven in the same direction and so as said member defines a continuous curve in passing from one position to another.

12 Claims, 20 Drawing Figures

U.S. Patent  March 2, 1976  Sheet 1 of 4  3,941,235
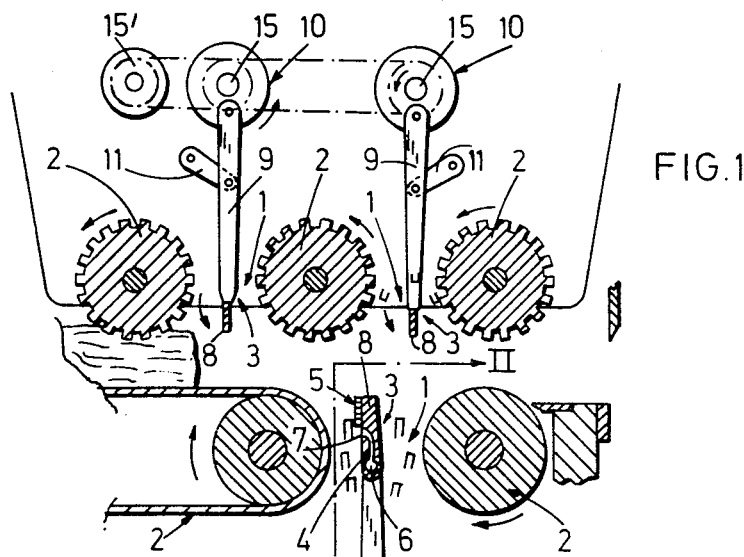
FIG.1
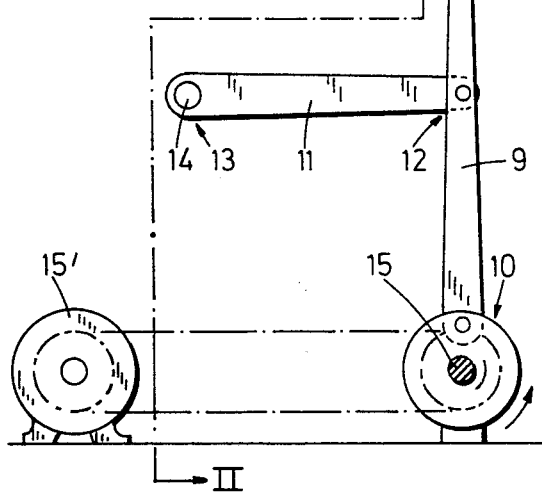
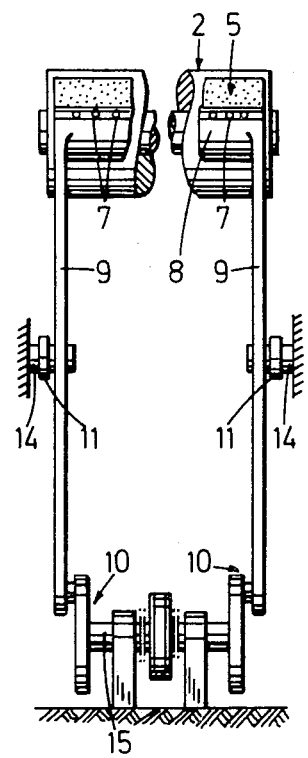
FIG.2

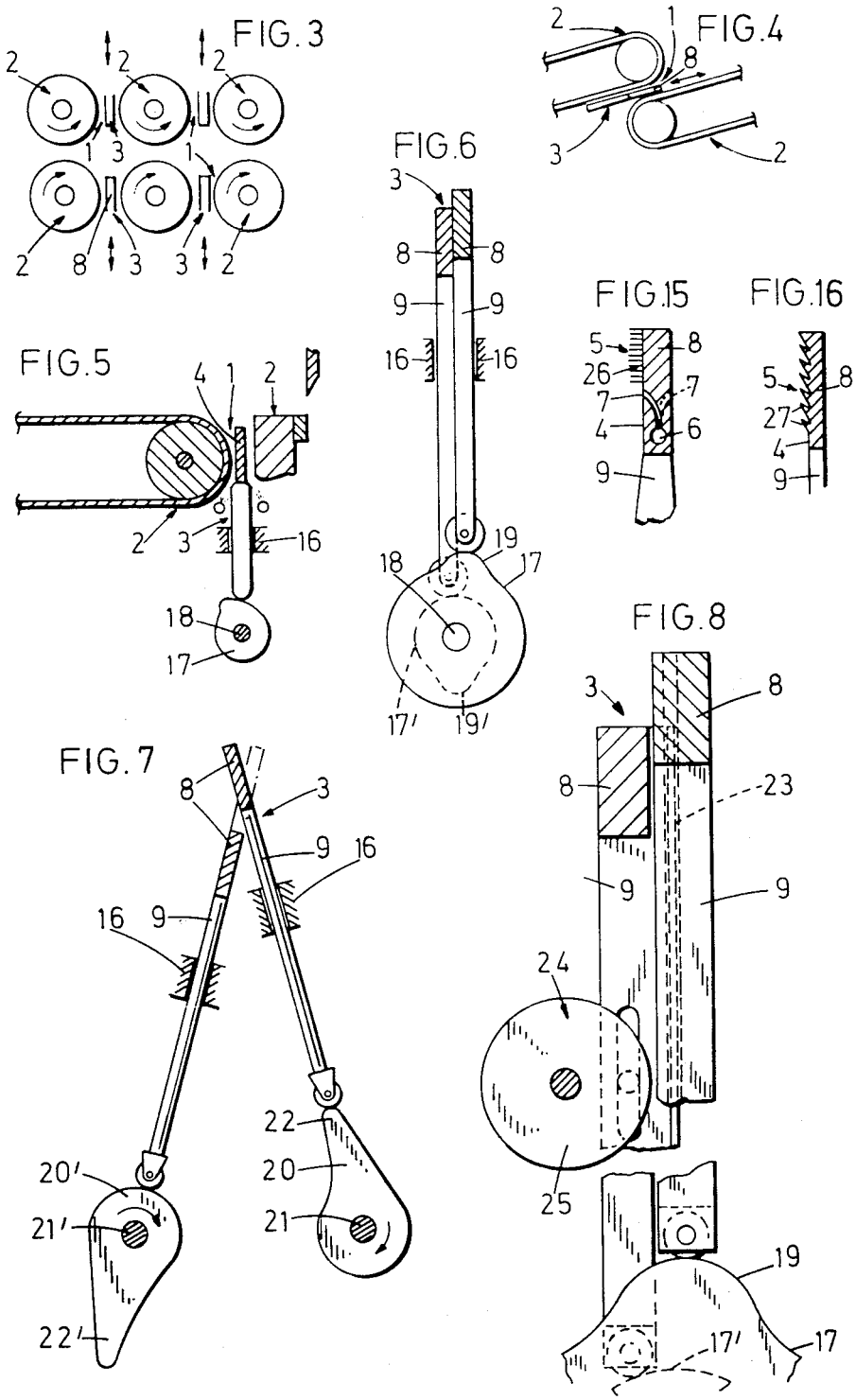

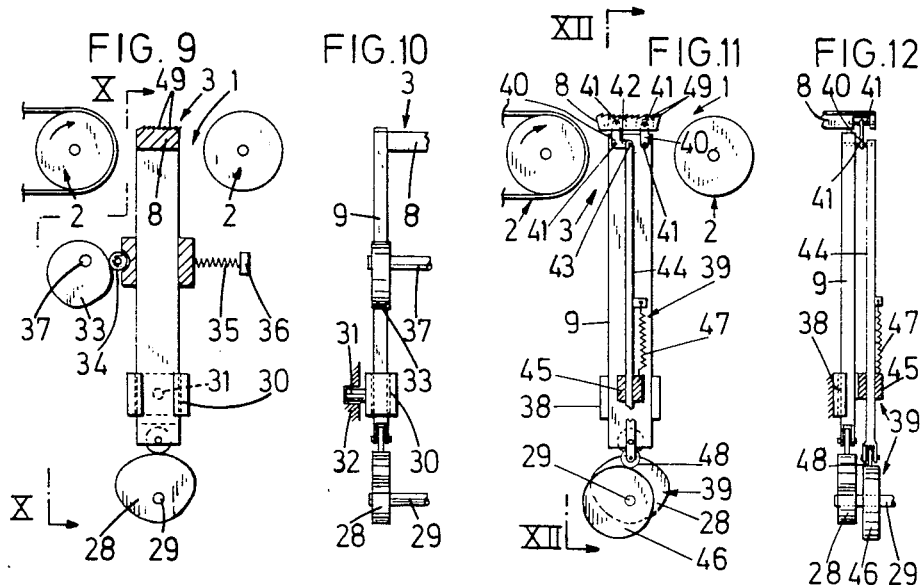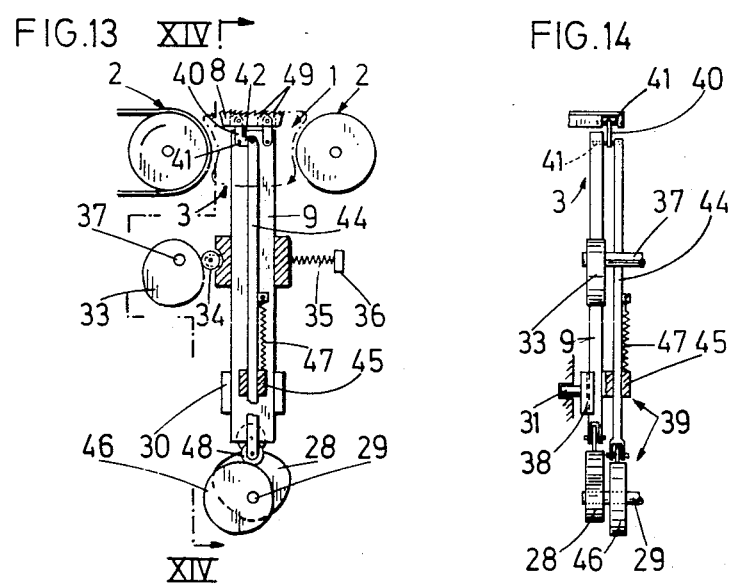

CONVEYOR WITH MEANS FOR PREVENTING ACCUMULATION OF MATERIAL

This invention relates to a conveyor and more particularly to a conveyor for materials in the shape of fibres lying in a sheet, which comprises at least two consecutive conveying elements the one of which at least is movable and between which there remains a space.

It is well known that in the conveyors used notably for conveying fibrous materials, material accumulations are formed in the spaces remaining between the conveyor elements, such material accumulations jamming said elements if measures are not taken to stop the conveyors at more or less frequent time intervals according to the kind of material being conveyed, to release said material accumulations, with the resulting drawback of causing the stoppage of every operation upstream and downstream of said conveyors and thus a decrease in the efficiency of the installations performing such operations, to which should be added the costs of the manpower required for the conveyor cleaning.

The invention has for object to obviate such drawback and to provide a conveyor which is so arranged that no material accumulation can occur in the spaces remaining between the elements comprising said conveyor.

For this purpose according to the invention, said conveyor comprises at least one movable member extending in said space cross-wise to the conveyor lengthwise axis and means for imparting to said movable member an alternating motion in or on either side of the median plane of said space between two end positions, a first end position in which the member takes over the material from the conveyor movable element which has entered said space, and a second end position in which said member lays the material having entered said space in such a position that said material will be taken over by the second conveyor element to pursue the conveying thereof on said conveyor.

In an embodiment of the invention, said member is provided on the surface thereof facing the movable conveyor element, with means for loosening the material therefrom when said material enters said space.

In an advantageous embodiment of the invention, said member is associated with a header supplying compressed air at least between the conveyor movable element and the member surface facing said element, said compressed air being so directed as to push back the material entering said space.

In a particularly advantageous embodiment of the invention, said member is comprised of a rigid rod with a thickness smaller than the width of said space, said rod being supported at both ends thereof by two parallel arms, each arm cooperating at the end thereof opposite to the rod, with an eccentric having an axis in parallel relationship with the rod and between the rod and the eccentric, with a link hinged at the one end thereof to said arm and at the other end thereof, to a fixed shaft the axis of which is in parallel relationship with the rod, said eccentrics mounted on the same driving shaft and said links being similar and so arranged that the elliptically-shaped rod travel the minor axis of which extends along the space width with a length somewhat shorter than the space width, occurs along the same direction as the movable element travel.

Other details and features of the invention will stand out from the description given below by way of non limitative example and with reference to the accompanying drawings, in which:

FIG. 1 is a diagrammatic elevation view in section, of a conveyor feeding a fibre cutter.

FIG. 2 is a section view along line II-II in FIG. 1.

FIGS. 3, 4 and 5 are diagrammatic elevation views showing other embodiments of the conveyor shown in FIGS. 1 and 2.

FIGS. 6 to 8 are diagrammatic views in elevation and in section showing other embodiments of movable members and the controls thereof, different from the ones shown in FIGS. 1 to 5.

FIGS. 9, 11, 13 and 17 to 20 are diagrammatic elevation views, with parts broken away, showing other embodiments of movable members provided with the controls thereof, different from the ones shown in FIGS. 1 to 8.

FIGS. 10, 12 and 14 are views with parts broken away along the lines X—X, XII—XII and XIV—XIV in FIGS. 9, 11 and 13.

FIGS. 15 and 16 are detail views of said movable members.

In the various figures, the same reference numerals pertain to similar elements.

Figure 17:
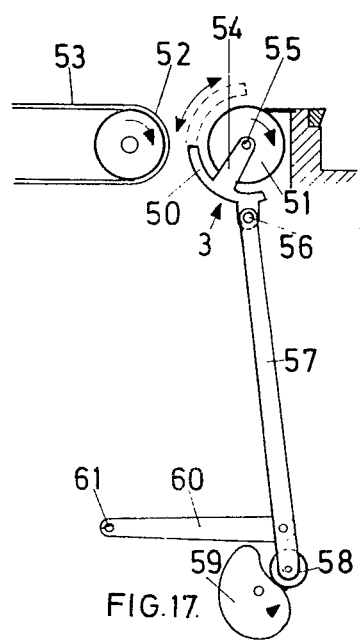

The conveyors according to the invention as shown in FIGS. 1 to 5 can be used with any kind of materials but they are particularly suitable for conveying materials in the shape of fibres lying in a sheet, for instance for feeding fibre cutters. Such conveyors are provided in each space remaining between movable elements 2 of said conveyors, with a movable member 3 to which is imparted an alternating motion for pushing back those fibres originating from that conveyor element lying upstream from said member, that enter said space so as to lay said fibres in the fibre sheet either at the bottom thereof or within said sheet, for the fibres to be taken over by the conveyor element lying downstream from said member and pursuing the feeding thereof without any accumulation in said space. Said member 3 extends over the whole width of the conveyor and it is located cross-wise to the conveyor lengthwise axis. To make it easier to release the fibres from the element 2 located upstream of the member 3, said member 3 is provided on the surface 4 thereof facing said element 2, with means 5 for releasing the fibres therefrom when they enter the space remaining between the elements located on either side of member 3. To complete the action of member 3 catching the fibres escaping from the sheet, said member 3 is advantageously associated to a header 6 that supplies compressed air at least between that conveyor element located upstream from the member and the surface 4 thereof, the openings 7 in the header 6 being so directed as to push the fibres back towards said sheet. Said header 6 extends over the whole length of said member and as shown in FIG. 1, it is provided in said member itself with the openings opening in the surface 4 thereof. It would of course be possible to provide said header 6 with another series of openings directing compressed air between member 3 and the conveyor element lying downstream therefrom. It would also be possible as shown in FIG. 5, to provide fixed headers 6 located on either side of said member 3 for supplying compressed air directed into said space so as to push the fibres back in the fibre sheet. As shown in FIGS. 1 to 5, said member or members 3 are comprised of a rigid rod 8 which is supported at both ends thereof by two parallel arms 9. To the members 3 shown in FIGS. 1 and 2 is imparted said alternating motion by means of said arms 9, the rod 8 of said members having a thickness smaller than the width of spaces 1. Each arm 9 of a member cooperates at the end thereof opposite to the rod 8, with an eccentric 10 having an axis in parallel relationship with said rod and between said rod 8 and eccentric 10, with a link 11 hinged at the end 12 thereof, to the arm 9 and at the end 13 thereof, to a fixed shaft 14 with an axis in parallel relationship with said rod. The eccentrics 10 which are mounted on one and the same driving shaft 15 driven by a motor 15', and the links 11 are identical and so arranged that the travel of rod 8 which is in the shape of an ellipse with the minor axis thereof extending along the space width and having a length somewhat shorter than the space width, is performed in the same direction as the travel of that conveyor element lying upstream of said member. The members 3 of the conveyors shown in FIGS. 3 to 5 are also comprised each of a rod 8 supported by parallel arms, said rod 8 having a thickness slightly smaller than the width of space 1 and the arms 9 sliding inside fixed guides 16 so arranged as to allow rod 8 to move in parallel relationship with itself towards the fibre sheet, each one of said arms 9 cooperating at the end thereof opposite rod 8, with a cam 17 so contoured as to insure the alternating motion of rod 8, said cams 17 being identical and mounted on one and the same driving shaft 18.

The member 3 arranged in each one of the spaces 1 of the conveyor, can also be comprised of a plurality of relatively-movable elements to which are imparted mutually-staggered motions. Such a member shown in FIG. 6 is comprised of two parallel rods 8 to each of which is imparted an alternating motion, said rods sliding on one another being driven by the arms 9 thereof which slide inside guides 16 so arranged that the rods 8 move in parallel relationship with themselves, each pair of arms 9 being controlled by two identical cams 17 or 17', the bosses 19 of cams 17 being displaced relative to the bosses 19' of cams 17' which are all made fast to one and the same driving shaft 18. The member 3 could also as shown in FIG. 7 be comprised of two rods 8 to which is imparted an alternating motion in such a way that they move in parallel relationship with themselves cross-wise to the fibre sheet, the arms 9 bearing said rods 8 being guided in 16 in such a way that the paths thereof cross one another, each pair of arms 9 being controlled by two identical cams 20 or 20' mounted on one and the same driving shaft 21 or 21', the bosses 22 of cams 20 being displaced by 180° relative to bosses 22' of cams 20' while the shafts 21 and 21' are driven at the same speed. To allow reducing the height of bosses 22 and 22' and consequently the travel of rods 8, said rods can be shaped as combs the teeth of which would intercross.

To insure for the rods 8 of member 3 shown in FIG. 8, displaced paths of elliptical shape, the arms 9 bearing said rods 8 sliding over one another, could be joined by slides 23 allowing each pair of arms to slide relative to the other pair of arms, along the lengthwise axis of said arms. Each pair of arms is then controlled by two identical cams similar to the ones shown in FIG. 6, while the arms of the one pair cooperate with an eccentric 24 having an axis in parallel relationship with rods 8, said eccentrics being mounted on one and the same driving shaft 25 the speed of which is synchronized with the one of shaft 18 bearing said cams so as to impart to each rod an elliptical travel in the same direction as the travel of the conveyor element lying upstream of said member. The cams controlling said members can of course be so contoured as to impart to rod 8 an accelerated motion over a portion of the travel thereof, notably when said rod is removed from the material sheet to be conveyed.

It is to be noticed that member 3 can be arranged at will between two successive conveyor elements, between a conveyor movable element and the successive fixed element, or still between a fixed element and a movable element. In any case, it is required to impart to the member when the path thereof is not straight, a motion along the same direction as the conveyor movement.

Said means 5 for releasing the fibres from the conveyor element located upstream of member 3 are comprised either of a brush as shown in FIG. 15, or of a felt piece attached to surface 4 of rod 8 of member 3, the material forming said brush or felt being so selected as to obtain the best possible grip with the fibres to be conveyed, said fibres once released from said element being taken over the fibre sheet as they are brought by said member 3 level with said sheet. Said means 5 could also as shown in FIG. 16, be comprised of teeth 27 formed in rod 8 of member 3, said teeth 27 being so directed as to draw the fibres released from the element located upstream from member 3, towards the fibre sheet as said member moves towards said sheet and as to release said fibres when said member moves away from said sheet.

The member 3 located in each space 1 of the conveyor can also be comprised as shown in FIGS. 9 and 10, of a rigid rod 8 supported at both ends thereof by two parallel arms 9 which each cooperate at the ends thereof opposite to the rod, with a cam 28 made fast to a shaft 29 in parallel relationship with rod 8, the cams 28 controlling both arms 9 being identical and mounted on one and the same driving shaft 29. The arms 9 are mounted so as to be slidable along the lengthwise direction thereof, inside guides 30 which can in turn swing about an axis at right angle to the lengthwise axes of arms 9 by means of pivots 31 cooperating with a fixed part 32. Each arm 9 is also controlled by a second cam 33 which bears on a roller 34 provided on arm 9, a spring 35 being provided to bear on arm 9 and a fixed part 36 so as to push continously the roller 34 against cam 33, the cams 33 controlling the arms 9 being identical and mounted on one and the same driving shaft 37 synchronized with shaft 29. The cams 28 and 33 are so contoured as to impart to rod 8 a motion along the same direction as the movement of that conveyor element 2 located upstream of member 3.

The member 3 shown in FIGS. 11 and 12 is a modification of the one shown in FIGS. 9 and 10 and it does comprise a rigid rod 8 supported by two parallel arms 9 that each cooperate with a cam 28 made fast to a shaft 29 with an axis in parallel relationship with rod 8, said cams 28 controlling the arms being identical and driven simultaneously by said shaft 29. The arms 9 are mounted in fixed guides 38 so as to be slidable along the lengthwise axis thereof. The rod 8 is movable relative to arms 9 and means 39 are provided thereon to drive the rod 8 with a swinging alternating motion on either side of that plane passing through the lengthwise axes of arms 9 in such a way that the combined movement imparted by the arms 9, the cams 28 and the means 39 occurs along the same direction as the movement of that conveyor element 2 located upstream of member 3. The means 39 are advantageously comprised of two links 40 provided on each arm 9, said links 40 being in parallel relationship and rotatably mounted on fixed shafts 41 provided on arm 9 and rod 8. The one link 40 has an extension 42 bearing a fixed shaft 43 the axis of which lies substantially in that plane passing through the lengthwise axes of arms 9, the shafts 29,41 and 43 being in parallel relationship. The shaft 43 cooperates with a second arm 44 parallel to arm 9 and which is guided by a guide 45 integral with arm 9 in such a way that said second arm 44 moves along the lengthwise axis thereof. The arm 44 is controlled by a cam 46 made fast to the shaft 29 while a return spring 47 is provided between arms 9 and 44 to push continuously the roller 48 thereof against cam 46.

The member 3 shown in FIGS. 13 and 14 is similar to the one shown in FIGS. 11 and 12 but it is moreover controlled by cams 33 similar to the ones controlling the member shown in FIGS. 9 and 10. To allow such control by the cams 33, the guides 38 have been replaced by guides similar to the guides 30 bearing the pivots 31.

As shown in FIGS. 9 to 14, the surface 49 of rod 8 is advantageously provided with projections 50 such as points or teeth which are directed along the movement direction of rod 8. As stated previously, the cams 28,33 and 46 can be so contoured as to impart to rod 8 an accelerated motion over a portion of the travel thereof, notably by the releasing of rod 8 from the material sheet to be conveyed.

The member 3 shown in FIG. 17 is comprised of a part 50 cooperating with a smooth roller 51 of the conveyor and following the shape thereof to push back by means of the alternating motion thereof, the material entering the space formed between said roller 51 and the end 52 of the conveying belt 53. Said part 50 is provided with two arms 54 mounted on the shaft 55 of roller 51 so as to be freely swingable about said shaft and said part is hinged in 56 to the one end of an arm 57 the other end of which is provided with a roller 58 cooperating with a cam 59 the axis of which is in parallel relationship with the smooth roller axis, the arm 57 being in turn hinged between part 50 and cam 59, to the one end of a link 60 the other end of which swings freely about a fixed shaft 61 with an axis in parallel relationship with shaft 55.

Figure 18:
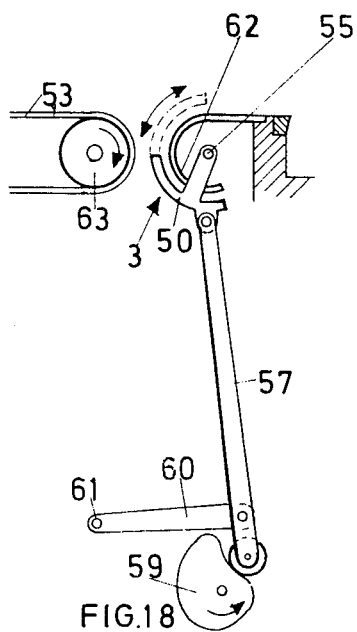

The member 3 shown in FIG. 18 and the control means thereof are identical to the ones shown in FIG. 17, the part 50 cooperating with a fixed conveyor element having a cylindrical portion 62 the axis of which is parallel to roller 63 of the conveying belt 53, the shaft 55 being fixed.

Figure 19:
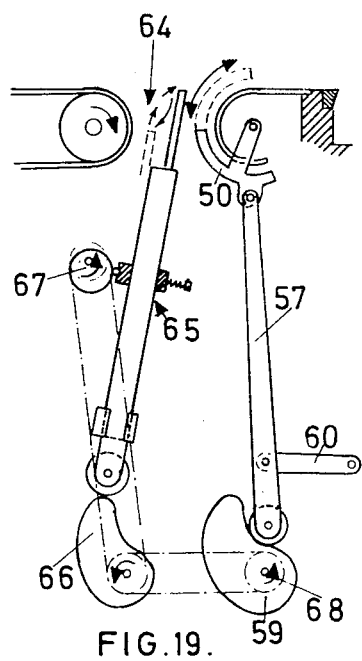
Figure 20:
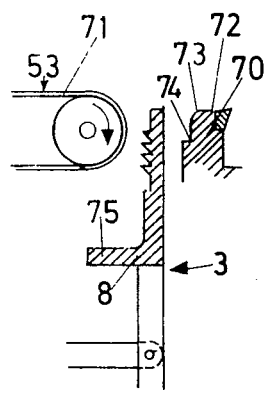

In FIG. 19, in space 64 present between part 50 and end 52 of the conveying belt is provided an additional member 65 the control means of which are similar to the control means of the member shown in FIGS. 9 and 10 and described hereinabove, the cams 66 and the eccentrics 67 which are part of said control means being driven from the shaft 68 bearing cam 59.

It is well understood that part 50 could be so arranged as to cooperate with the end 52 of conveying belt 53 by means of arms 54 mounted on the shaft of cylinder 63.

Remarkable results have been obtained with a conveyor for materials in the shape of fibres which comprises a fixed element 70 located on a level lower than the upper reach 71 of the conveying belt 53 that comprises the movable conveyor element. The surface 72 of element 70 has a cylindrical portion 73 and a projection 74 at the bottom thereof. The member 3 which is provided in the space remaining between both elements is similar to the one shown in FIGS. 1 and 2, the rod 8 having an L-shaped cross-section, such a shape having the advantage of collecting in area 75 of rod 8, the fibres that escape in the space and which are taken over by the member movement by the conveyed fibre sheet. Said shape due to the extent of the rod prevents the fibres winding around said rod, while insuring finally a very good rigidity of the rod.

It must be understood that the invention is in no way limited to the above embodiments and that many changes may be brought therein without departing from the scope of the invention as defined by the appended claims.

Thus it would be possible to provide according to the invention, a member 3 not shown in the drawings which could comprise at least one row of teeth in line to which is imparted such a motion that the end of said teeth will move in the same direction as the conveyor element located upstream of said member and follows in space 1, a path of elliptical shape the major axis of which extends along the space with in such a way that said fibres convey the fibres coming loose from the element located upstream of said member towards the conveyor element located downstream thereof.

We claim:

1. Conveyor, particularly a conveyor for materials in the shape of fibres lying in a sheet, said conveyor comprising at least two consecutive conveying elements at least one of which is movable and between which there remains a space; at least two movable parallel rods supported at their ends by arms and extending in said space cross-wise to the lengthwise axis of the conveyor, said rods being slidable on one another and said arms sliding inside guides so arranged as to allow the rods to move in parallel relationship with themselves; and moving means including two identical cams associated with each pair of arms, said cams having staggered bosses and being mounted on one and the same driving shaft, said moving means imparting to each arm an alternating motion such that each rod moves on either side of the median plane of said space between four positions as follows: a first end position in which the rod takes over the material falling in said space, a second end position in which the rod lays the material having entered said space in such a position that said material will be taken over by the second conveyor element to pursue the conveying thereof on said conveyor, and two intermediate positions in which the rod is situated in the proximity of the conveyor movable element and the second conveyor element; said moving means being arranged so as the rod and said conveyor movable element are driven in the same direction and so as the rod defines a continuous curve in passing from one position to another, the movements of the rods being mutually displaced.

2. Conveyor, particularly a conveyor for materials in the shape of fibres lying in a sheet, said conveyor comprising at least two consecutive conveying elements at least one of which is movable and between which there remains a space; at least two movable parallel rods supported at their ends by arms and extending in said space cross-wise to the lengthwise axis of the conveyor, said rods being movable in parallel planes and being guided such that the paths thereof cross one another; and moving means including two identical cams for controlling each pair of arms, said cams having bosses and being mounted on one and the same driving shaft, the bosses of the cams controlling one pair of arms being displaced relative to the bosses of the cams controlling the other pair of arms, the cam driving shafts being parallel and driven at the same speed, said moving means imparting to each arm an alternating motion such that each rod moves on either side of the median plane of said space between four positions as follows: a first end position in which the rod takes over the material falling in said space, a second end position in which the rod lays the material having entered said space in such a position that said material will be taken over by the second conveyor element to pursue the conveying thereof on said conveyor, and two intermediate positions in which the rod is situated in the proximity of the conveyor movable element and the second conveyor element; said moving means being arranged so as the rod and said conveyor movable element are driven in the same direction and so as the rod defines a continuous curve in passing from one position to another, the movements of the rods being mutually displaced.

3. Conveyor, particularly a conveyor for materials in the shape of fibres lying in a sheet, said conveyor comprising at least two consecutive conveying elements at least one of which is movable and between which there remains a space; at least two movable parallel rods supported at their ends by arms and extending in said space cross-wise to the lengthwise axis of the conveyor, said rods being slidable on one another and the arms being joined by slides allowing each pair of arms to slide relative to the other pair of arms along the lengthwise axis of said arms; and moving means including two identical cams having displaced bosses for controlling each pair of arms and being mounted on one and the same driving shaft, the arms of one pair cooperating each with an eccentric having an axis in parallel relationship with said rods, the eccentrics being mounted on one and the same driving shaft and imparting to each rod an elliptical path occuring along the same direction as the conveyor movable element, said moving means imparting to each arm an alternating motion such that each rod moves on either side of the median plane of said space between four positions as follows: a first end position in which the rod takes over the material falling in said space, a second end position in which the rod lays the material having entered said space in such a position that said material will be taken over by the second conveyor element to pursue the conveying thereof on said conveyor, and two intermediate positions in which the rod is situated in the proximity of the conveyor movable element and the second conveyor element; said moving means being arranged so as said member and said conveyor movable element are driven in the same direction and so as the rod defines a continuous curve in passing from one position to another, the movements of the rods being mutually displaced.

4. Conveyor, particularly a conveyor for materials in the shape of fibres lying in a sheet, said conveyor comprising at least two consecutive conveying elements at least one of which is movable and between which there remains a space; at least one movable member extending in said space cross-wise to the lengthwise axis of the conveyor; and moving means for imparting to said movable member a motion on either side of the median plane of said space between four positions as follows: a first end position in which the member takes over the material falling in said space, a second end position in which said member lays the material having entered said space in such a position that said material will be taken over by the second conveyor element to pursue the conveying thereof on said conveyor, and two intermediate positions in which said member is situated in the proximity of the conveyor movable element and the second conveyor element; said means for moving said movable member being arranged so as said member and said conveyor movable element are driven in the same direction and so as said member defines a continuous curve in passing from one position to another, said member being comprised of a rigid rod with a thickness smaller than the width of said space, said rod being supported at both ends thereof by two parallel arms which each cooperate at the end thereof opposite the rod with a cam made fast to a shaft in parallel relationship with said rod, said cams controlling the arms being identical and mounted on one and the same driving shaft, said arms being mounted so as to be slidable along the lengthwise axis thereof, inside guides which are in turn swingable about an axis at right angle to the arm lengthwise axes, each one of said arms being also controlled between the rod and the cam, by a second cam with an axis in parallel relationship with the first cam, said second cam bearing on a roller provided on one arm side, a spring bearing at one end thereof on a fixed part while the other spring end bears on that arm side opposite said roller substantially level therewith, both second cams being made fast to one and the same driving shaft the movement of which is synchronized with the shaft bearing said first cams, the cams being so contoured as to impart to said rod a motion along the same direction as the conveyor movable element motion.

5. Conveyor as claimed in claim 4, in which the member rod is movable relative to the arms, said means being provided to drive the rod with an alternating swinging movement on either side of that plane passing through the arm lengthwise axes, the combined motion imparted to the rod by the arms driven by the first and second control cams thereof and said means occuring along the same direction as the conveyor movable element movement.

6. Conveyor as claimed in claim 4, in which that rod surface opposite the arm control cams is provided with projections for catching the material from the conveyor movable element.

7. Conveyor as claimed in claim 6, in which said projections are directed along the member movement direction.

8. Conveyor, particularly a conveyor for materials in the shape of fibres lying in a sheet, said conveyor comprising at least two consecutive conveying elements at least one of which is movable and between which there remains a space; at least one movable member extending in said space cross-wise to the length-wise axis of the conveyor; and moving means for imparting to said movable member a motion on either side of the median plane of said space between four positions as follows: a first end position in which the member takes over the material falling in said space, a second end position in which said member lays the material having entered said space in such a position that said material will be taken over by the second conveyor element to pursue the conveying thereof on said conveyor, and two intermediate positions in which said member is situated in the proximity of the conveyor movable element and the second conveyor element; said means for moving said movable member being arranged so as said member and said conveyor movable element are driven in the same direction and so as said member defines a continuous curve in passing from one position to another, said member being comprised of a part cooperating with the one end of one conveying element and so contoured as to follow the shape of said end, said part having two arms mounted on a conveyor shaft so as to be freely swingable about said shaft to push back the material entering said space, said part being hinged at the one end thereof to at least one arm the other end of which cooperates with a cam having an axis in parallel relationship with the axis of said shaft, said arm being in turn hinged between the part and the cam, to the one end of a link the other end of which swings freely about a fixed axis in parallel relationship with the axis of said shaft.

9. Conveyor as claimed in claim 8, in which to said part is associated a second member located in the space remaining between said part and the end of that conveyor element with which said part does not cooperate, said second member being comprised of a rigid rod with a thickness smaller than the width of said space, said rod being supported at both ends thereof by two parallel arms which each cooperate at the end thereof opposite the rod, with a cam made fast to a shaft in parallel relationship with said rod and said conveyor element shaft, the cams controlling said arms being identical and mounted on one and the same driving shaft, said arms being mounted so as to be slidable along the lengthwise direction thereof, inside guide which are in turn swingable about an axis at right angle to the arm lengthwise axes, each one of said arms being also controlled between the arm and the cam, by an eccentric with an axis in parallel relationship with said cam, said eccentric bearing on a roller provided on the one arm side, a spring bearing at the one end thereof on a fixed part while the other spring end bears on that arm side opposite said roller substantially level therewith, both eccentrics being made fast to one and the same shaft rotated from that shaft bearing said cams, said cams being so contoured as to impart to said rod a motion along the same direction as the conveyor movable element movement, said shaft bearing said cams being rotated by means of the shaft bearing the cam controlling said part.

10. Conveyor, particularly a conveyor for materials in the shape of fibres lying in a sheet, said conveyor comprising at least two consecutive conveying elements at least one of which is movable and between which there remains a space; at least one movable member extending in said space cross-wise to the lengthwise axis of the conveyor; and moving means for imparting to said movable member a motion on either side of the median plane of said space between four positions as follows: a first end position in which the member takes over the material falling in said space, a second end position in which said member lays the material having entered said space in such a position that said material will be taken over by the second conveyor element to pursue the conveying thereof on said conveyor, and two intermediate positions in which said member is situated in the proximity of the conveyor movable element and the second conveyor element; said means for moving said movable member being arranged so as said member and said conveyor movable element are driven in the same direction and so as said member defines a continuous curve in passing from one position to another, said member being comprised of a rigid rod with a thickness smaller than the width of said space, said rod being supported at both ends thereof by two parallel arms which each cooperate at the end thereof opposite the rod, with a cam made fast to a shaft with an axis in parallel relationship with said rod, the cams controlling said arms being identical and mounted on one and the same driving shaft, said arms being so mounted inside fixed guides as to be slidable along the lengthwise axis thereof, said rod being movable relative to said arms, means being provided on said arms to drive the rod with an alternating swinging motion on either side of that plane passing through the arm lengthwise axes, the combined motion imparted to the rod by the arms and said means occuring along the same direction as the conveyor movable element movement.

11. Conveyor as claimed in claim 10, in which said means are comprised of two links provided on each one of said arms at the end thereof opposite the control cam thereof, said links being in parallel relationship and swingably mounted on fixed shafts provided on said arm and said rod, the one link having an extension bearing a shaft in parallel relationship with said shafts and with the shaft bearing the shaft control cams and the axis of which lies substantially in the plane passing through the arm lengthwise axes, said fixed shaft on said extension cooperating with a second arm in parallel relationship with said arm lengthwise axis and being guided inside a guide integral with said arm so as to be movable along the lengthwise axis thereof, said fixed shaft being controlled by a cam made fast to that shaft bearing said arm control cams, a return spring being provided between the first arm and the second arm to bias continuously said second shaft towards the control cam thereof.

12. Conveyor, particularly a conveyor for materials in the shape of fibres lying in a sheet, said conveyor comprising at least two consecutive conveying elements at least one of which is movable and between which there remains a space; at least one movable member extending in said space cross-wise to the length-wise axis of the conveyor, said movable member is provided on the surface thereof facing the movable conveyor element with a brush for loosening the material from said movable conveyor element when the material enters said space, said brush being formed of a material which grips the material being conveyed; and moving means for imparting to said movable member a motion on either side of the median plane of said space between four positions as follows: a first end position in which the member takes over the material falling in said space, a second end position in which said member lays the material having entered said space in such a position that said material will be taken over by the second conveyor element to pursue the conveying thereof on said conveyor, and two intermediate positions in which said member is situated in the proximity of the conveyor movable element and the second conveyor element; said means for moving said movable member being arranged so as said member and said conveyor movable element are driven in the same direction and so as said member defines a continuous curve in passing from one position to another.

* * * * *